United States Patent [19]

Lovrich et al.

[11] 4,236,446
[45] Dec. 2, 1980

[54] CHECK-DIGIT PRINTING MEANS

[75] Inventors: Vincent Lovrich, Waldwich; George J. Sundell, River Edge, both of N.J.

[73] Assignee: Autographic Business Forms, Inc., Mahwah, N.J.

[21] Appl. No.: 971,107

[22] Filed: Dec. 19, 1978

Related U.S. Application Data

[63] Continuation-in-part of Ser. No. 879,595, Feb. 21, 1978, abandoned.

[51] Int. Cl.³ ............... B41L 45/00; G08C 25/00
[52] U.S. Cl. ............................... 101/79; 101/72; 340/146.1 AJ; 235/431; 235/92 EC; 364/738
[58] Field of Search .................. 101/72, 76, 77, 79, 101/82, 84, 93.11; 235/92 EC, 61.7 R; 340/146.1 AG, 146.1 AJ; 364/738

[56] References Cited

U.S. PATENT DOCUMENTS

| | | | |
|---|---|---|---|
| 3,254,596 | 6/1966 | Shoup et al. | 101/102 |
| 3,571,581 | 3/1971 | Kaus | 340/146.1 AJ |
| 3,650,205 | 3/1972 | Wybrow et al. | 340/146.1 AJ |
| 3,778,766 | 12/1973 | Rapp | 340/146.1 AJ |
| 3,815,495 | 6/1974 | Straukbein | 101/79 X |
| 4,085,670 | 4/1978 | Poole | 101/76 |

OTHER PUBLICATIONS

Larin et al., IBM Tech. Discl. Bulletin, vol. 10, No. 12, May, 1968, pp. 1872–1873.

*Primary Examiner*—Edward M. Coven
*Attorney, Agent, or Firm*—Hopgood, Calimafde, Kalil, Blaustein & Lieberman

[57] ABSTRACT

The invention contemplates a document printer for the automatically indexed sequential account numbering of successive documents, with the added feature of printing alongside each sequential number an automatic indication of the validity or invalidity of the number printed, said indication being a "check digit" which, in conjunction with the printed account number, renders the printed account number self-checking. The invention is described in application to weighted-modulus self-checking systems of the Modulus 10 and Modulus 11 varieties, inter alia.

26 Claims, 12 Drawing Figures

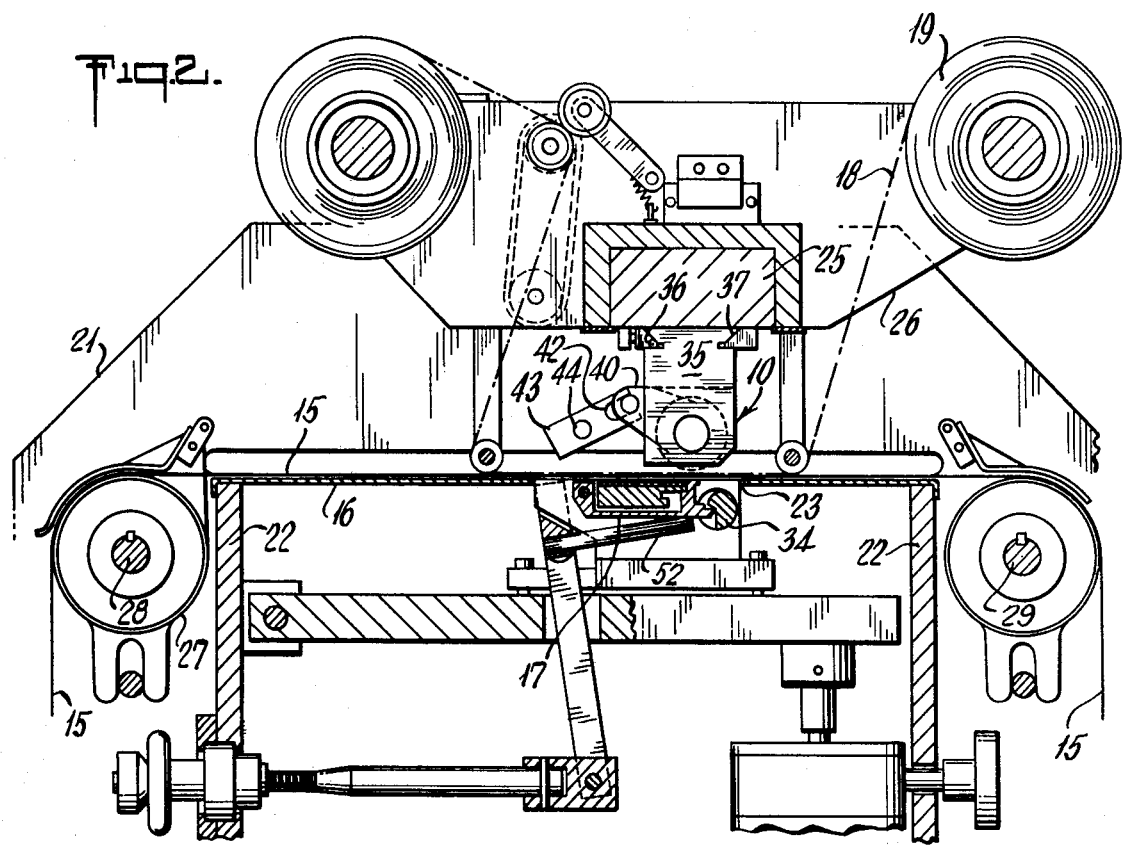

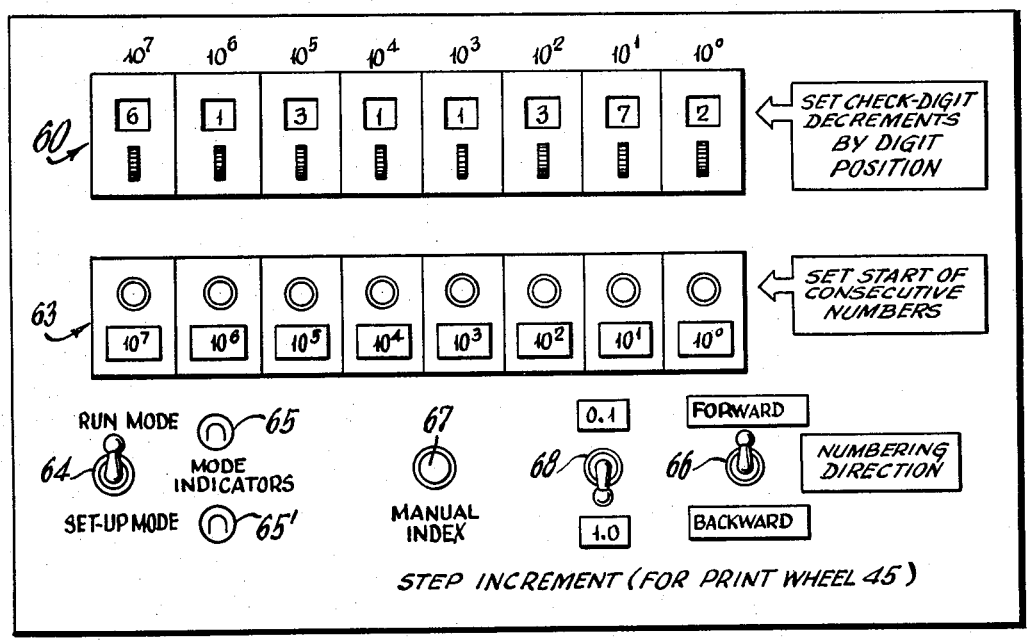
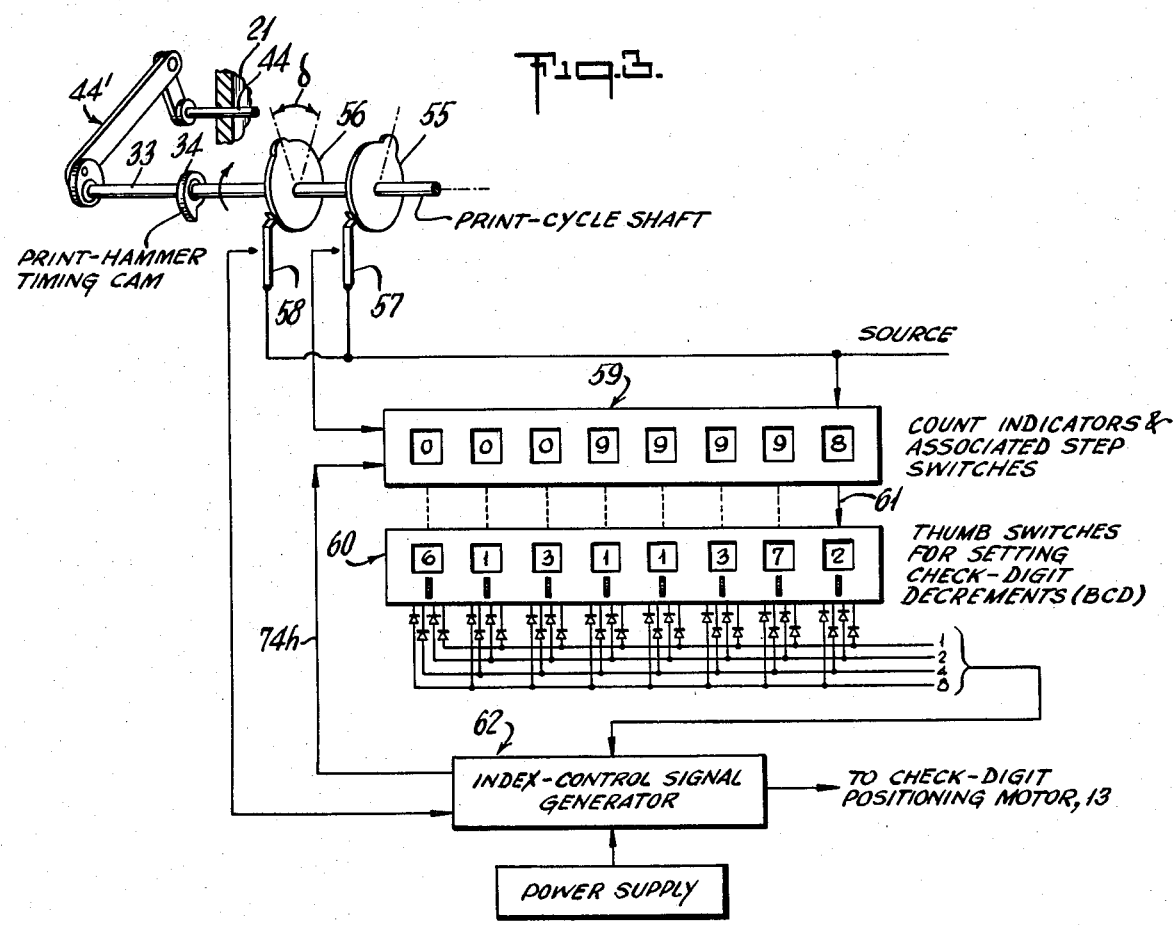

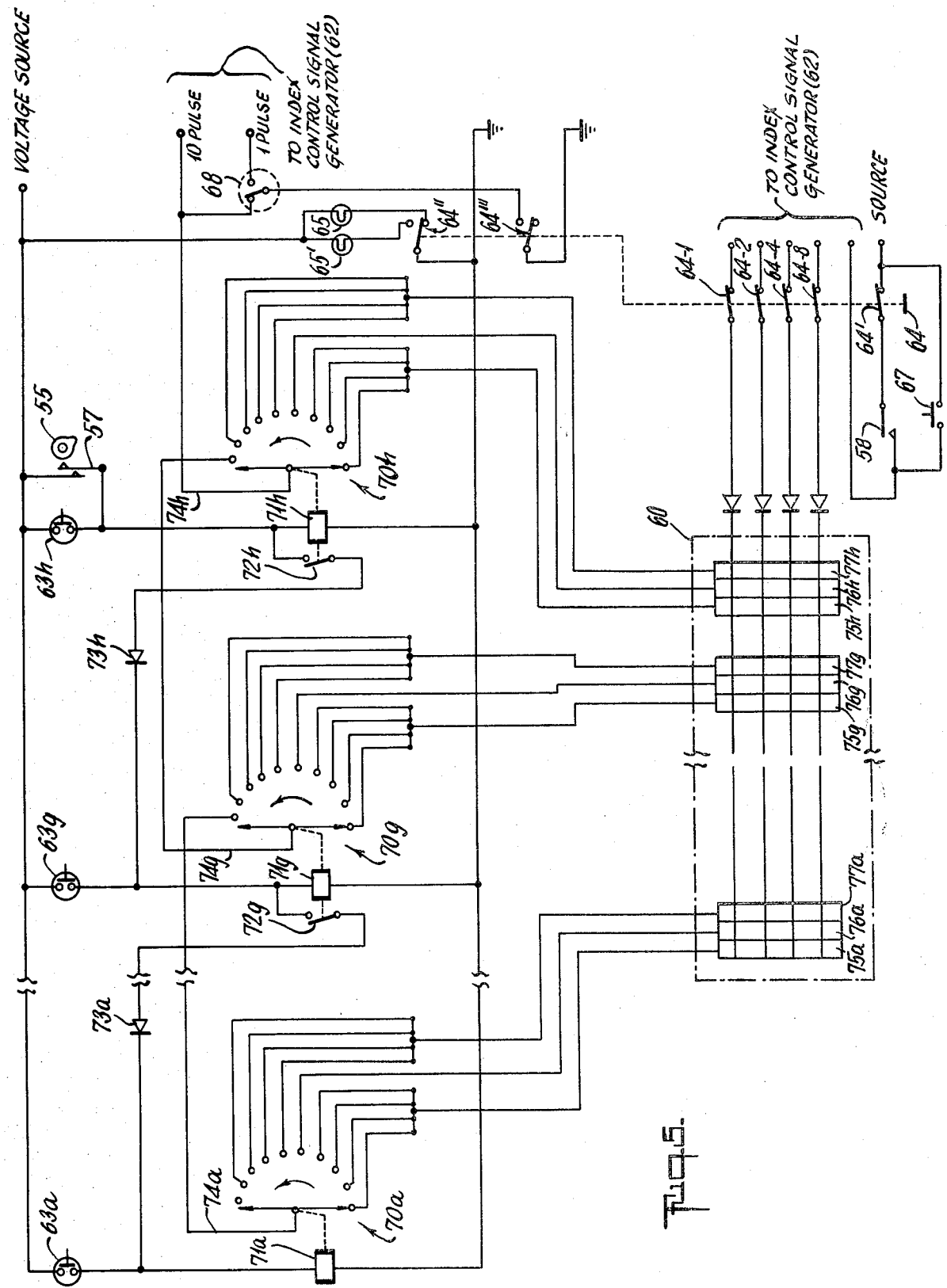

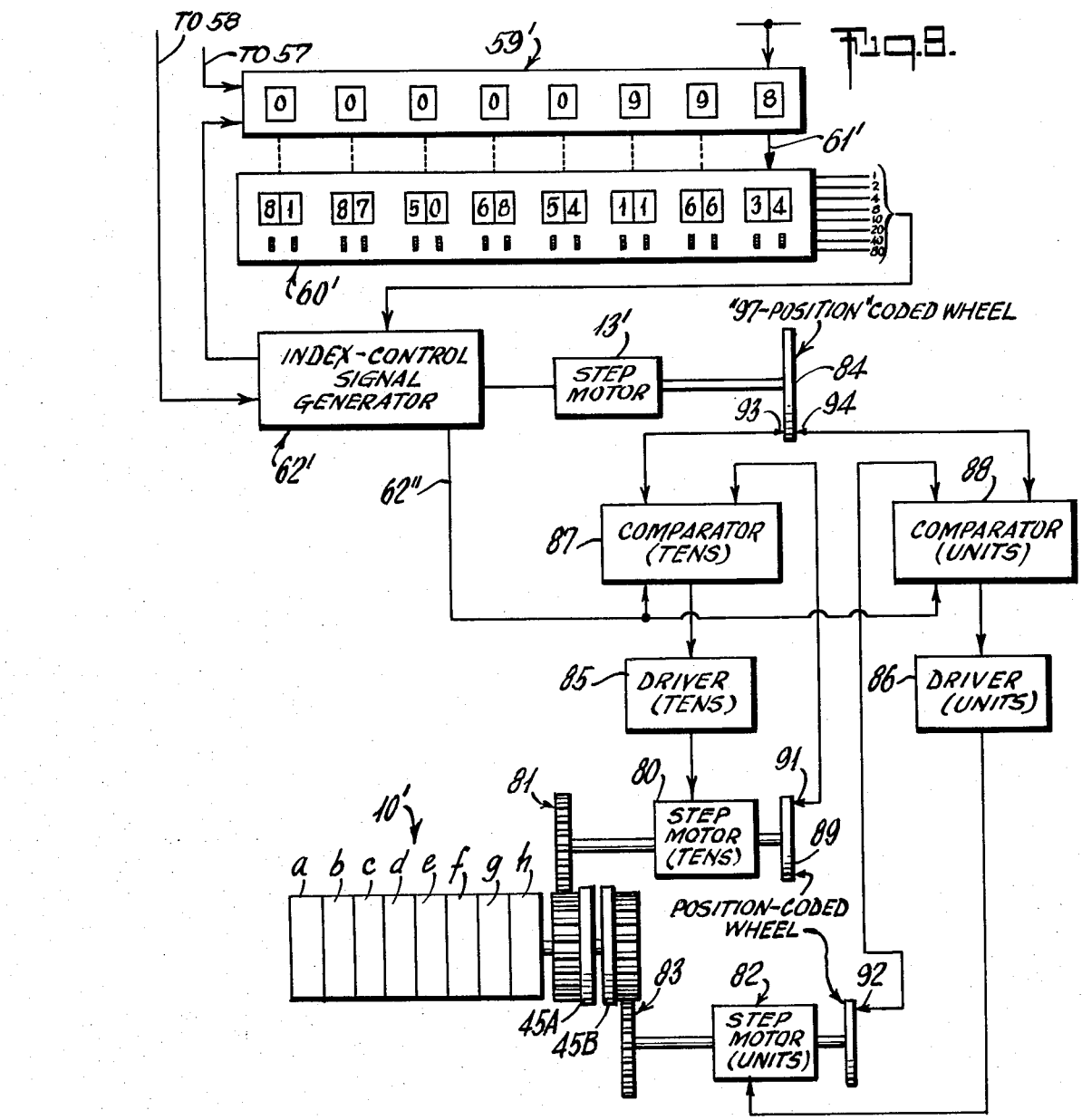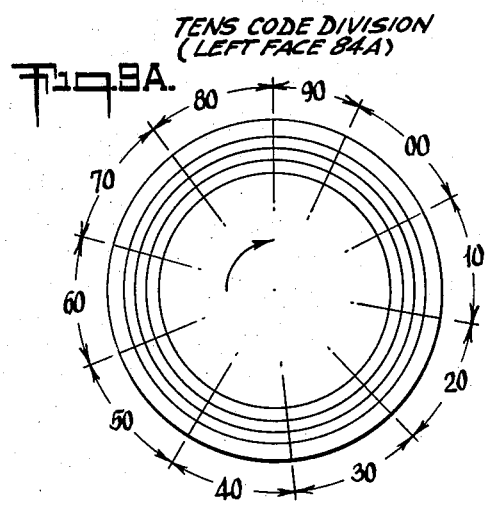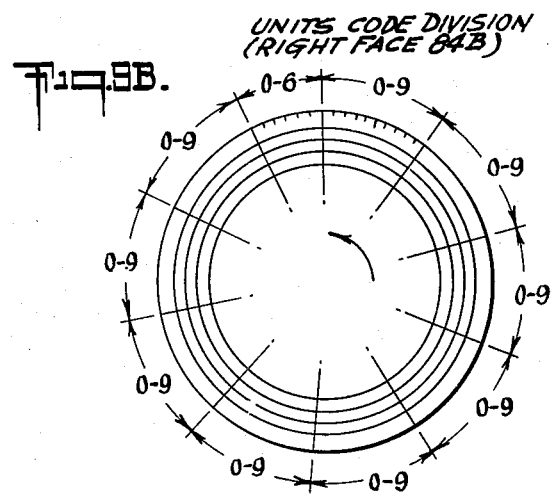

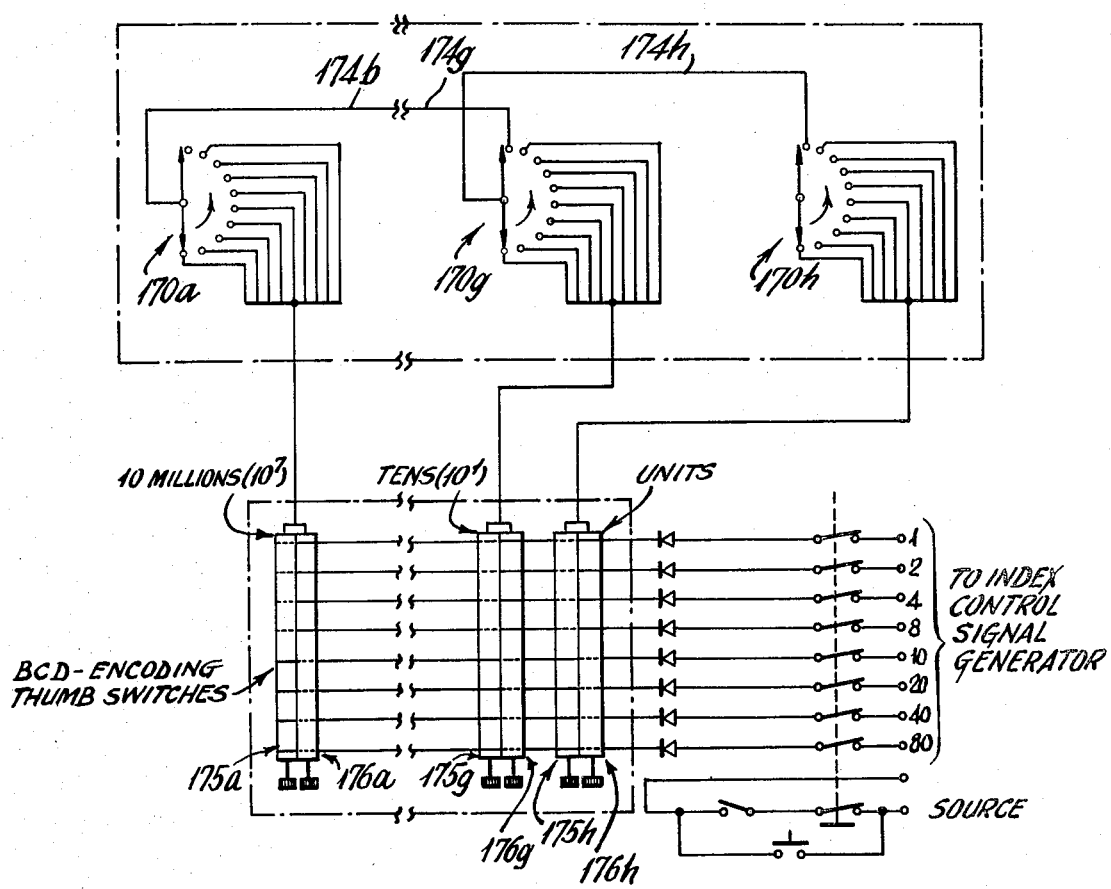
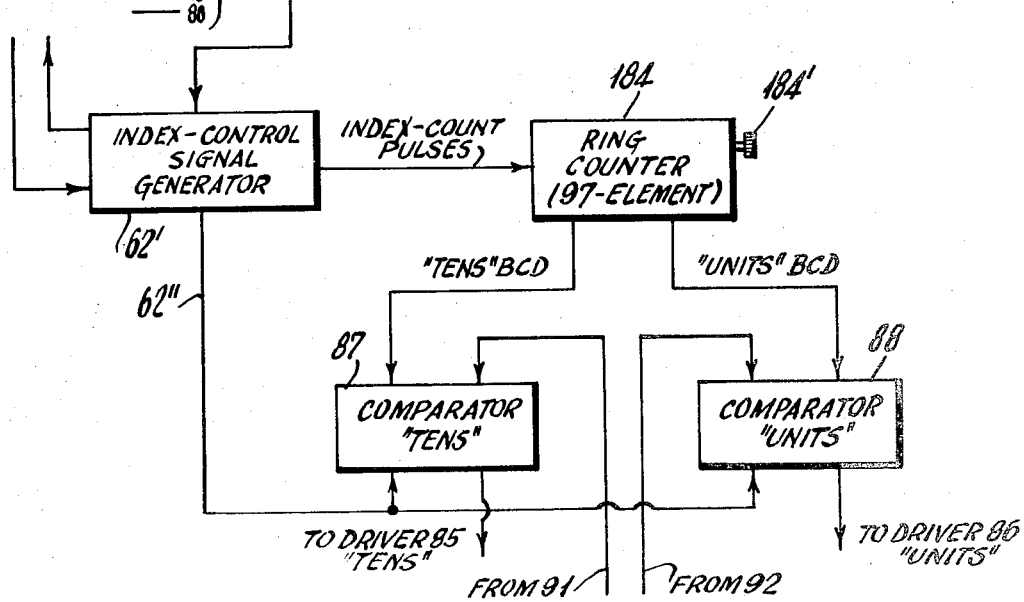

CHECK-DIGIT PRINTING MEANS

This application is a continuation-in-part of our co-pending application, Ser. No. 879,595, filed Feb. 21, 1978, now abandoned.

The invention relates to an improved document printer for the sequential numbering of documents wherein a weighted-modulus check digit is printed alongside the serial number to render the printed number self-checking.

With the advent of machines which can read various type faces at very high speeds, and of computers that can perform any calculations for verification, there is a need for a system to insure that serialized numbers printed on forms, cards and the like are accurate, that there are no duplicate numbers or missing numbers. For users, such as hospitals, insurance companies, financial institutions, freiqght forwarders, and department stores, to name only a few industries, the assurance that the consecutive numbering on a form is correct and that it can be verified when entering the system can save thousands of dollars a day by the elimination of numbering errors.

The weighted-modulus numbering system provides such substantially improved accuracy, by increasing reliability of consecutive numbering to over 95 percent. To accomplish this, each consecutive number printed is multiplied by a formula which generates a self-check digit that is printed alongside the consecutive number, e.g., to the right of the units position of the printed consecutive number. Based upon the formula used, there can be only one acceptable self-check digit for each consecutive number, and the verification of this number in the system, whether by computer or keypunching, insures that an absolute minimum of numbering errors is ever allowed into the system.

There are two basic weighted-modulus self-checking systems from which many derivations have been developed for specific applications. The Modulus 10 system will detect the three most common types of errors; namely, errors of (1) transcription, (2) transposition, and (3) random errors. The Modulus 11 system will detect double-transposition errors in addition to the noted Modulus 10 features and does so with 100 percent accuracy, all except for random errors, which the Modulus 11 system will catch 97 percent of the time.

So far as we know, there has been no previous application of weighted-modulus check-digit printing in conjunction with consecutive numbering of documents such as business forms, without involving a computer operation; neither has there been any means of developing a check digit for each of a particular succession of consecutive numbers without performing all the computative steps required by the formula of the particular weighted-modulus system involved.

It is accordingly an object of the invention to provide an improved consecutive-numbering document printer which additionally prints a self-check digit for each consecutive number, according to a predetermined weighted-modulus system.

Another object is to meet the above object with means having application to a high-speed consecutive-number printing mechanism.

A further object is to meet the above objects with relatively simple mechanism which lends itself to relatively inexpensive retrofit of existing consecutive-numbering document printers.

It is also an object to meet the above objects with mechanism having the capacity to selectively serve both Modulus 10 and Modulus 11 self-checking systems, with simple and ready set-up for or change-over from one to the other of these systems.

Still another object is to meet the above objects with printing means of the character indicated, which lends itself with equal facility to forward or to backward consecutive numbering and which is inherently operable whatever the starting or the finishing number in the consecutive series to be printed, within the digit-position printing capacity of the particular printing means to which the invention is applied.

A specific object is to meet the above objects with simplified check-digit-determining means which does not involve or require a separate formula computation for each check digit to be printed.

Another specific object, in conjunction with a Modulus 11 employment of the invention is to provide means automatically operative to print an invalidating indicium adjacent the printed consecutive number, whenever the Modulus 11 formula calls for a two-digit solution.

Still another specific object is to provide a consecutive-number printing system with automatic check-digit printing involving multiple-digit check-digit numbers.

A further specific object is to provide a self-check system of the above character, employing Modulus 97.

Other objects and various further features of novelty and invention will be pointed out or will occur to those skilled in the art from a reading of the following specification, in conjunction with the accompanying drawings. In said drawings which show, for illustrative purposes only, preferred embodiments of the invention:

FIG. 2 is a sectional view taken substantially at the plane 2—2 of FIG. 1;

FIG. 3 is a simplified electrical block diagram illustrating the functional relation between consecutive-number counting and check-digit shift, for each style of consecutive-number printing in the machine of FIG. 1;

FIG. 4 is a front view of the set-up panel within the control unit of FIG. 1;

FIG. 5 is a fragmentary showing of circuit components and connections within the block diagram of FIG. 4;

FIG. 6 is a perspective view of a consecutive-number print head, with check-digit printing means employable in the machine of FIG. 1;

FIG. 7 is an enlarged and exploded view in perspective, showing a replaceabe check-digit printing component in the printing head of FIG. 6;

FIG. 8 is a view similar to FIG. 7 to show a modification;

FIGS. 9 and 10 are diagrams of the general nature of FIGS. 3 and 5, respectively, to illustrate a two-digit check-digit embodiment of the invention;

FIGS. 9A and 9B are simplified diagrams of a coded-wheel component, used in the circuit diagram of FIG. 9; and FIG. 11 is a fragmentary block diagram to show modification of a part of FIG. 9.

Figure 1:
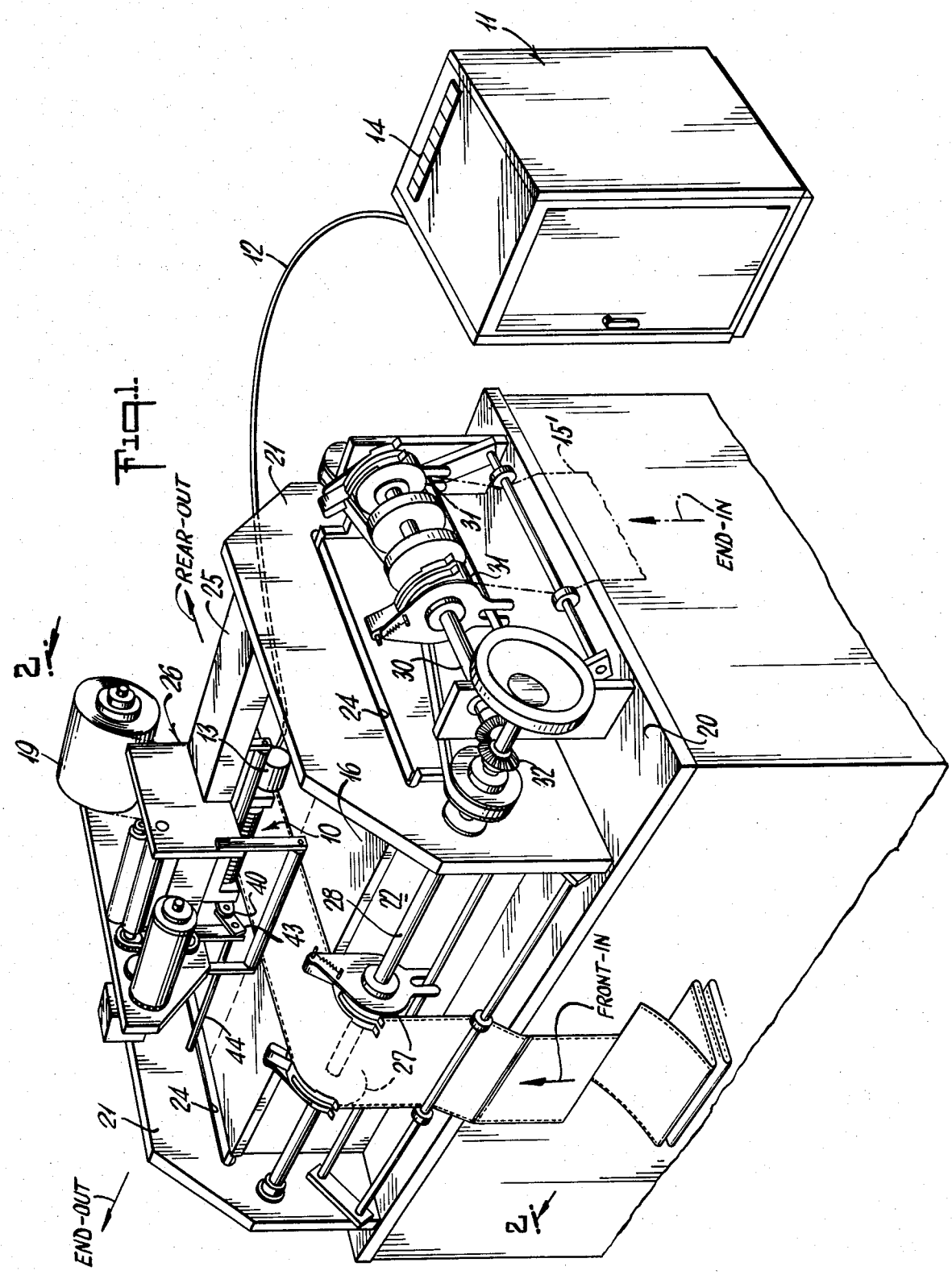
FIG. 1 is a perspective view of a document printer to which check-digit printing means and an associated control unit of the invention have been applied.

Briefly stated, the invention proceeds from the basic observation that in any series of consecutive numbers, and regardless of the number of digits in a particular number within the series, the formation of the next-consecutive number in the series involves but a one-digit shift in the "units" position of the number involved, unless the particular number involved happens to have a "9" in the "units" position, in which case the one-digit increment makes said next-consecutive number a "10", namely, a two-digit number involving a "0" in the "units" position and a one-digit increment in the "tens" position. Thus, only every tenth single-digit increment gives rise to a one-digit change in the "tens" position. Similarly, only every 100th single-digit increment gives rise to a one-digit change in the "100's" position; only every 1000th single-digit increment gives rise to a one-digit change in the "1000's" position; only every 10,000th single-digit increment girise to a one-digit change in the "10,000's" position; and so on, as to the geometrically descending frequency with which a single-digit increment produces a one-digit change in a particular higher-order position in the multiple-digit numbers involved. Stated in other words, and if all zeros are ignored in the sequence of consecutive numbers, a one-digit increment from one to the next-consecutive number in the series always involves one and only one numerical-digit change, in one and only one of the digit positions, and only to the extent of a one-digit change in said one digit position. It is observed that to ignore all zeros in any check-digit evaluation is to strictly observe a point in common for all weighted-modulus systems, namely, that in performing the basic operative steps of the calculation, one must individually multiply a pre-assigned digit-position weighting number by the particular numberical digit in the given digit position; and if that particular digit happens to be a zero, the multiplying step must develop a product equal to zero, meaning that such product is of zero value in the ensuing summation forming part of the succession of formula steps.

The invention also proceeds from the basic observation that, whatever the modulus system or whatever the digit-position weighting pattern adopted in connection therewith, the unit check-digit change, for a one-digit increment wholly in the "units" position, will always be in the same magnitude and direction of change; the same can be said as to each one-digit increment which involves a one-digit change in the "tens", "100's", "1,000's", or any other higher-order digit position; except that such one-digit change in each higher-order digit position will always involve a check-digit change of magnitude and direction unique to the particular digit position involved. Thus, for example, in one illustrative weighted Modulus 11 system, a one-digit change in consecutive numbering having eight digit positions will involve:

A. a check-digit decrement of two, if the number change is in the "units" position;

B. a check-digit decrement of seven, if the number is in the "tens" position;

C. a check-digit decrement of three, if the number change is in the "100's" position;

D. a check-digit decrement of one, if the number change is in the "1000's" position;

E. a check-digit decrement of one, if the number change is in the "10,000's" position;

F. a check-digit decrement of three, if the number change is in the "100,000's" position;

G. a check-digit decrement of one, if the number change is in the "1,000,000's" position; and H. a check-digit decrement of six, if the number change is in the "10,000,000's" position.

It is convenient to tabulate the foregoing check-digit decrements, by digit position, as follows:

| Digit Position: | $10^7$ | $10^6$ | $10^5$ | $10^4$ | $10^3$ | $10^2$ | $10^1$ | units |
|---|---|---|---|---|---|---|---|---|
| Check-Digit Decrements: | −6 | −1 | −3 | −1 | −1 | −3 | −7 | −2 |

And to additionally describe this particular illustrative Modulus 11 system, we tabulate the weighting pattern, by digit position, as follows:

| Digit Position: | $10^7$ | $10^6$ | $10^5$ | $10^4$ | $10^3$ | $10^2$ | $10^1$ | units |
|---|---|---|---|---|---|---|---|---|
| Positional Weighting: | 3 | 2 | 7 | 6 | 5 | 4 | 3 | 2 |

The invention utilizes the foregoing observations by providing a check-digit print wheel, mounted upon and preferably adjacent to the "units" end of a conventional sequential-numbering print head having one print wheel for each of the digit positions of the numbers to be printed. In an Arabic-numbering sequence, each of the print wheels of the print head has ten indexible positions, engraved in accordance with the ten-digit sequence of a decade, and conventional actuating means are utilized to establish a single-digit advance (or decrease, if so selected) in the multiple-digit number sequence, the advance being to present at a printing-plane orientation the correct engraved digit of each print wheel to assure printing of the number currently set; synchronizing means assure correlation of each single-digit advance with the retracted or inactive portion of the print-stroke cycle of the document printer to which the invention is applied. Also synchronized with the print-stroke cycle is control mechanism for determing and effecting the applicable increment or decrement involved in repositioning the check-digit print wheel, appropriate to the particular one-digit increment involved in the series of consecutive numbers. To this end, the control mechanism senses the particular digit position at which a numerical change (other than to a zero) is involved; having sensed the particular digit position involved in the change, the control mechanism employs the check-digit decrement unique to that digit position, in the controlled drive of a positioning motor for the check-digit print wheel.

In the case of a Modulus 11 system, the check-digit print wheel is engraved for indexed positioning to print in one of eleven positions, representing the eleven possible different solutions of the weighted-modulus formula involved. Ten of these engraved positions are assigned different single digits of the succession of ten in a single decade. The eleventh position, being numerically indentifiable only with two digits, and a two-digit solution being incompatible with existing Arabic-decade print readers, the eleventh-position check-digit solution is deemed to be invalid, and the "invalid" position is suitably engraved to indicate the invalidity, as by the word "VOID". Thus, for example, in the illustrative-weighting pattern given above, an eight-number sequence involving an "invalid" number and decrements attributable to number changes in different digit positions can be tabulated, with accounting for check-digit numbers and the digit positions responsible for particular decrements, as follows:

| Serial Number | Check Digit* | Check Digit Decrement | Digit Position Involving Single-Digit Change |
|---|---|---|---|
| 00099998 | 9 | | |
| | | −2 | Units |
| 00099999 | 7 | | |
| | | −3 | $10^5$ |
| 00100000 | 4 | | |
| | | −2 | Units |
| 00100001 | 2 | | |
| | | −2 | Units |
| 00100002 | "VOID" | | |
| | | −2 | Units |
| 00100003 | 9 | | |
| | | −2 | Units |

*An 11-position check-digit wheel, printing "VOID" at the position between "0" and "1".

Referring initially to FIGS. 1 and 2, the invention is shown in application to a high-speed document printer of the type disclosed in greater detail in Shoup, et al., U.S. Pat. No. 3,254,596, and in the present application it is of significant importance that a print head 10 shall be operative not only to print consecutive numbers upon each successive business form or other product passing continuously through the machine but also to print a correct check digit adjacent each such consecutively printed number. In the machine to be described, the consecutive numbers are accommodated within an eight-digit capacity, and the check digit is limited to a single digit placed adjacent the "units" position of the consecutive numbering; this is true for all numbers unless, as in the specific weighted "Modulus 11" system to be first described, the particular consecutive number happens to be "invalid" within such system, in which case the print-head prints the word "VOID" as a clear warning of the "invalidity" of the particular document. A separate count of the currently applicable and printed consecutive number is kept in a check-digit control module 11 having a flexible control connection 12 to a drive motor 13 forming part of the print head 10. The module 11 presents at 14 an upper-surface display of the current serial number within the consecutive series being printed, and set-up control means to be described (in connection with FIGS. 3 to 5) is accessible only upon unlocking and opening an access door at the front of module 11.

The document printer of FIGS. 1 and 2 provides support of a continuous web 15 in the horizontal plane of a table 16, across which there is selective availability of web-feeding on either of two orthogonally oriented paths of continuous movement; these paths are labeled "End-IN" to "End-OUT", and "Front-IN" to "Rear-OUT", the web 15 being shown set up for the latter of these paths. Printing is accomplished by reacting impact of a hammer 17 against the currently-characterized face of print head 10, via web 15 and a pigmented ribbon 18 (FIG. 2) from a supply reel 19.

Although the invention will be described in connection with continuous web having provision for sprocket feeding, it will be appreciated that such feeding is illustrative, in that it happens to be the means of synchronizing web placement for precise location of printing impressions. For "unit documents" (e.g., cut sheets, individual forms, cards, or the like), suitable feeding devices (not shown) may be employed to continuously deliver each unit document to the printing region for precisely synchronized imprinting. Thus, it will be understood that references to "web material" herein contemplates continuous or intermittent feed of continuous web as well as of suitably fed cut or other unit documents.

The printing machine of FIG. 1 is based on a frame 20, shown as the top deck of supporting structure which may be at essentially counter height, and which together with module 11 may be supported on casters for mobility in application and use. The machine frame includes a pair of upstanding end end plates 21 secured to base plate 20 and providing journal support for various shafts. Side plates 22 also support the table 16, over which web 15 is drawn. Printing occurs at a central location within table 16, and, at the particular printing location, there is a table opening 23 (FIG. 2). Each of the end plates 21 extends substantially above the web-supporting surface of table 16 and, at the level of table surface, is provided with a slotted opening 24 through which web (suggested at 15') may be fed freely, should the "End-IN" to "End-OUT" direction of web movement be selected. Above the slot location or plane of table 16, the plates 21 provide support for an elongate spacer and guide bar 25, for adjustably supporting the printing head 10 and a carriage 26 for the ribbon-support and feed mechanism.

For the presently illustrated embodiment, the machine accommodates continuous web material having marginal apertures of standard configuration, and the feed mechanism embodies sprockets at both the "IN" and "OUT" ends of web travel through the machine, whichever particular direction is selected. Thus, in FIG. 1, for web 15 entering the "Front-IN" side of the machine, the web passes over a first pair of sprockets 27, adjustably positioned and spaced on a sprocket-drive shaft 28, journalled in the end plates 21. It will be understood that at the "Rear-OUT" end of the trajectory for web 15, and after having passed the printing location, further web-feeding sprocket means including a further drive shaft 29 (FIG. 2) may draw off the imprinted-web product for feeding to suitable folding, stacking, cutting, collating or other device (not shown). For the "End-IN" to "End-OUT" direction of movement of web 15', similar "IN" and "OUT" sprocket drives are provided; of these, the "IN" shaft 30 for spaced sprockets 31 is visible in FIG. 1, the same having a bevel-gear pick-off at 32 from drive shaft 28 to assure their operation in unison; a similar "OUT" sprocket drive (not shown) for web 15' will be understood also to have a bevel-gear pick-off connection to shaft 28 on the far side of the machine, the same being masked by the far plate 21 in FIG. 1. Electric-motor means (not shown) will be understood to provide drive to the shafts 28-29-30 and to other shafts including a print-cycle shaft 33 (FIG. 3) for driving a trip member or cam 34 (FIG. 2) for operating the print hammer 17. Phase-adjustment means to enable adjustment for predetermined tension or slack in web 15 (15') between the "IN" and "OUT" sprockets, and to enable the exact timing of print-hammer action to achieve desired printint location within each unit-product area of the web, are described in detail in said patent and therefore need not be repeated here.

The print head 10 is shown in FIG. 6 to comprise a rugged base 35 with dovetail formations 36 to enable adjusted retention by and at a selected position along a dovetail groove 37 on the underside of spacer bar 25. The print-head base includes a pair of spaced projecting end plates 38-39 for journaled support of a plurality of print wheels (a, b, c, . . . h) for printing the current consecutive number; each such print wheel is characterized by a single-digit numerical type face at each of a succession of ten equal angular spacings, and the number of such print wheels is shown to be eight consistent with the 8-digit serial-number capacity of the machine. A serial-number index-actuating crank 40 external to plate 38 carries a follower pin or roll 41 to engage the slot 42 (FIG. 2) and an oscillating crank 43; crank 43 is mounted to a shaft 44 which will be understood to derive angular oscillation in synchronism with the print cycle, such means being shown in said patent. Thus, crank 40 will be understood to impart to the print wheels a, b, c, ... h a one-way engaging unit-advancing actuation, once per print cycle.

The print head 10 incorporates further mechanism for imprinting a check digit, unique to each serial number in the consecutive series. The means for deriving the check digit to be printed will be later described, but it suffices here to identify a check-digit print wheel 45 (see also FIG. 7) having suitably engraved single-digit numerical printing indicia at each of ten out of eleven equally divided print locations at the printing end 46 of wheel 45. The central body 47 of wheel 45 is grooved to accept the mount of an insert 48 to print "VOID" in the eleventh (and remaining) print location, a locking set screw 49 being shown to retain the assembled insert. The other end of body 47 carries a drive gear 50 by which the output spur gear (not shown) of the check-digit positioning motor 13 drives gear 50 via adjustably positionable idler means 51. The consecutive-number print wheels, a, b, c, ... h will be understood to be advanced in one-digit increments, and only in accordance with oscillation of shaft 44, in synchronism with the print cycle; the check-digit wheel 45, with its single-digit printing end 46 adjacent the "units" end of the consecutive number print wheels, will be understood to have no mechanical connection with the consecutive-number print wheels, other than journal support on the same axis between plates 38-39, the only actuation of digit wheel 45 being via the indicated gear-train connection from motor 13.

It will be understood that each indexing of a print wheel or wheels brings the applicable type face into alignment with all other type faces to be printed, such alignment being in a single fixed horizontal print-impression plane at the underside of print head 10 and parallel to the dovetail mount 36 thereof. This print-impression plane contains the currently set impression face of printing head 10, closely adjacent and in facing relation to the plane of the web 15 (or 15'), i.e., close to the plane of the table surface 16. To make a printing impression, hammer means 17 is pivotally suspended below the table surface 16 and its striking end rises for momentary striking impact against the print face, the web and the pigmented ribbon 18 being momentarily squeezed by the impact. For present purposes it suffices to state that the hammer mechanism receives its recycling synchronized actuation from cam 34 on shaft 33 which is continuously rotating, once per unit-document advance of web 15 along the table surface 16. The hammer-operating cycle comprises a gradual downwardly cammed displacement of the strike end of hammer 17, against increasing force reaction from preloading spring means 52, and cam 34 is contoured to release hammer means 17 for printing impact at a predetermined instant in the cycle of shaft 33. Synchronizing connections as between drive to shaft 33 and oscillating drive to number-advancing shaft 44 will be understood to assure suitable interlace of the printing function with respect to the number-indexing function.

THE CHECK-DIGIT OPERATING MEANS

Referring to FIG. 3, the check-digit determination, and actuation of positioning motor 13 in accordance with such determination, are effected in response to control stimuli which are also synchronized to occur in phase-interlace with the hammer-release function of cam 34. To this end, two further cams 55-56 on the print-cycle shaft 33 are sequentially operative to close timing-pulse switches 57-58, at a predetermined delay $\delta$ therebetween. Switch 57 supplies one pulse per cycle to an 8-digit counter 59 (with display at 14), which may contain eight individual digit-position count indicators and a step switch associated with each count indicator. Output connections exist between each digit-position step switch and a corresponding digit-position multiplier in a modulus-function unit 60.

The modulus-function unit comprises a series of single-digit displays at each of the eight digit positions corresponding to those of the digit-position capacity of serial-number display and step-switching at 59. As shown, each of the eight single-digit displays as unit 60 is associated with a thumb switch whereby individual single-digit numbers can be manually selected, so as to determine a binary-coded decimal (BCD) output appropriate to the selected single-digit number. As will later more clearly appear, in any given cycle only one operative connection is ever made between a step switch (within the display and switching unit 59) and a corresponding thumb switch (within the modulus-function unit 60); to make this point unambiguously, we have used dashed-line interconnections between corresponding step switches at 59 and thumb switches at 60, except for a single solid-line connection 61 which is illustratively shown for the most frequently operative digit position, namely, the "units" position.

Since in any given print cycle only a one-digit change is involved in only one digit position*, the four conductor BCD outputs of all thumb switches at 60 may be connected in parallel. The thus-connected BCD lines are identified in FIG. 3 by their respective BCD values (1-2-4-8), and are fed directly to an index-control signal generator 62. Generator 62 may be a commercially available pulse generator producing on command a precisely numbered quick succession of position-controlling pulses, for direct drive of a compatible and commercially available stepping motor, here used as the check-digit position motor 13. In an illustrative employment of generator 62, a succession of ten pulses, on command, is operative upon motor 13 to actuate a one-digit positional decrement of the check-digit print wheel 45, at the plane of printing impression. The illustrative current cycle (FIG. 3) establishes connection 61 at the "units" position, where the thumb switch setting happens to be "2". This being the case, the BCD output of module 69 is "2", i.e., a "1" in the second-digit line, and "0" in each of the first, third and fourth of the BCD output lines. Generator 62 is thus set, on command, to apply a two-digit decremental displacement signal ($2 \times 10$, or 20 pulses, in the illustrative case) to motor 13; the command is issued by the $\delta$-delayed pulse produced by switch 58, operatively connected to generator 62.

*It being recalled that all zeros are ignored in any weighted-modulus system.

In the case of a cycle in which the consecutive-number advance (zeros ignored) occurs at a different digit position, for example in the 10's position, the applicable thumb-switch setting is "7", generator 62 will be caused, upon command from switch 58, to generate a motor-drive train of 70 pulses, causing motor 13 to impart a 7-digit decrement shift in the positioning of check-digit wheel 45. For consistency of presentation in application to the above-described weighted Modulus 11 system, the thumb-switch settings shown in FIG. 3 at the respective digit positions of unit 60 are in exact accord with the tabulation set forth above. Also, the serial number selected for display at 59 accords with one involving a "units"-position advance in the succession of seven consecutive numbers discussed above.

Before proceeding with a more detailed description of electrical interconnection of step switches at 59 with thumb switches at 60, it is helpful to consider the control panel of FIG. 4, accessible upon opening the door of module 11, and used only to set up the described machine for a particular printing job run. It will be recalled that the upper-surface display at 14 reflects the current consecutive-number setting of the print head 10, but since there is no direct connection between display 14 and the serial number setting of print head 10, provision is made for the set-up man to correlate display 14 with the initial serial-number setting at 10.

Let us say that the job to be run requires 10,000 consecutively numbered documents, from serial number 10,567,001 to serial number 10,577,000, complete with check digits in the above-described Modulus 11 system, positionally weighted according to the succession 3-2-7-6-5- 4-3-2 as also described above. But let it further be assumed that the previous use of the machine was in application to a Modulus 10 system, requiring a different check-digit print wheel, as will later be described. To set up for the new Modulus 11 run, therefore, the Modulus 10 print head 10 must be disassembled from its dovetail mount 37 to the machine, and a Modulus 11 print head 10 installed. Before applying the Modulus print head, the operator will set the consecutive-number wheels a, b, c, ....h to the desired start number (10,567,000), less a conservative allowance of say 50, to allow for check out of all necessary phase and synchronizing adjustments for the particular job, as to assure correct placement of printed numbers within the specified unit-document format. Having installed print head 10 with the particular number 10,566,950 (10,567,000, minus 50), he must set the display at 14 accordingly; this is done by operating a series of push buttons at 63 on the panel of FIG. 4, there being one push button for each digit position, and a one-digit advance being produced at 14 for each push-button operation at 63. Having made this initial correlating adjustment, the display at 14 will thereafter always correctly indicate the current serial-number print setting of the print head 10, because both the oscillation cycle of mechanical serial-number advance (at 10) and the cam (55) operated cycle of electrical serial-number advance (at 14) are synchronized with the print-cycle shaft 33, such mechanical synchronizing of oscillation shaft 44 being symbolized by an eccentric pickoff connection 44' to shaft 33 in FIG. 3.

Having correlated his serial-number settings, the operator next sets his thumb switches at 60 on the panel of FIG. 4, thus displaying at 69 that he has set each digit position for its correct check-digit decrement, shown in the left-to-right or descending order of digit positions as 6-1-3-1-1-3-7-2.

Next, having now only the need to assure (a) that the module-indicated serial number at 14 is fully coordinated with each successively printed number and (b) that all phasing adjustments are made, and making sure that a selector switch 64 is set to its run-mode position (with confirming lamp indication at 65), the machine may be briefly operated to produce a trial succession, e.g., five or ten consecutive document printings. This will confirm to the operator not only that the printed serial numbers are consecutively advancing but that their advance is matched by the display at 14. If there should prove to be, say, a one-digit lagging disparity between printed and displayed serial numbers, it is a simple matter to add a one-digit advance to the display 14, by a single pressing of the "units" button at 63. If there should prove to be a similar but leading disparity between printed and displayed serial numbers, switch 64 should be shifted to its set-up mode position (with confirming lamp indication at 65'), thereby internally disabling the pulse-generating functions of cam switches 57-58, and the machine can be jogged through one or more print cycles to enable the instantaneously set consecutive number at print head 10 to catch up to the number displayed at 14.

While in the set-up mode, further adjustments may be required to assure correct initial setting of the check-digit print wheel 45, to correspond with the formula-computed check digit for the currently displayed serial number. The above-described trail run will have produced a "check-digit" impression alongside each printed serial number, but the check digit may not be correct. By comparing a printed check-digit (for a given printed serial number) against the formula-computed check-digit solution, the operator can determine whether and to what extent the check-digit print wheel 45 should be displaced. A selector switch enables him to select whether he will make the corrective step in the "forward" or "backward" direction, upon each press of a manual index button 67. To simplify his correctional displacements, another selector switch 68 provides the option at a "1.0" position, of calling for a full-step (i.e., one-digit) change in the positioning of the check-digit print wheel 45 (i.e., for each press of index button 67, a 10-pulse control-signal train from generator 62 to motor 13); switch 68 provides the further option, at a "0.1" position, of calling for a much smaller indexing step, involving but a single pulse control signal from generator 62 to motor 13, for each press of index button 67. It will be appreciated that in the "0.1" selected position of switch 68, and with switch 66 positioned as may be directionally appropriate, the operator is enabled to bring the printed correct check digit into exactly aligned adjacent relation to all concurrently printed consecutive-number digits.

Having performed adjustments as noted above, the operator has placed the machine in readiness for automatic operation, upon return of switch 64 to its run-mode position. The door of Module 11 may be closed and locked, leaving visible only the current consecutive-number display at 14. To the extent that this number is still short of the specified job-start number, the machine should be run until several document printings have been made beyond the specified job-start number, to permit removal and destruction of every printed-number prior to the job-start number, and the printing run may then proceed to completion. Alternatively, the straight run of the machine can produce a continuous succession of documents from a point preceding the job-start number, the documents having the unspecified serial numbers preceding and following the specified 10,000-document range being severed and destroyed prior to packing and shipment to the customer.

As a double-check on or verification of the fidelity of check-digit printing on the above-described 10,000-document job, it is suggested that a small commercially available programmable printing calculator, such as the Hewlett-Packard H-P 9815A be programmed to independently perform the rigorous formula operations involved in the specified 10,000-number sequence, i.e., from serial number 10,567,001 to 10,577,000, and that the print-out be made complete with the adjacent individually computed check digit for each serial number, the "invalid" numbers being programmed for print-out of the word "VOID" is place of a check digit. A complete 10,000-number sequence would of course show and therefore permit checking of all calculated check digits against thoe printed by the machine. Alternatively, we find it satisfactory to program the calculator only to print out the "VOID"-identified numbers, which can also be more readily spotted in a visual check against a particular one or more of the "VOID"-printed documents of the production run. After a few such experiences, confidence in printed check-digit accuracy will build, and the need for checking will reduce a minimum, as for example, to verifying the first and the last "VOID"-printed documents in the job run.

Reference is now made to the electrical schematic diagram of FIG. 5, which specifically shows decade-counting stepping switches 70$h$, 70$g$ .... 70$a$, contained within the counting unit 59 and respectively serving the "units" ($10^0$), "tens" ($10^1$) and $10^7$ digit positions within the 8-digit position capacity of the illustrative embodiment, it being understood that similar stepping switches, similarly connected, also serve the intervening digit positions of the consecutive-number counting unit 59. The mode-selection switch 64 is then, in the "run" position to have plural completed contacts 64-1, 64-2, 64-4, 64-8 serving to connect the BCD output lines from the thumb-switch unit 60 to the index-control signal generator 62; additionally, in the "run" selected position, contacts 64' provide circuit completion from the index-command cam switch 58 to the index-control signal generator 62, and further contacts 64" complete a circuit for the run-mode indicator lamp 65, which may be mounted for external visibility, as alongside the consecutive-number display 14. In the "set-up" mode position of switch 64, the BCD-output circuit connections are opened, the index cam switch 58 is effectively disabled, and the set-up mode lamp 65' is lighted to the exclusion of lamp 65; additionally, a further contact 64''' enables the "1.0" vs. "0.1" selector switch 68, determinative of the displacement increment of motor 13, for each press of the manual index push-button switch 67.

The contact arm of the "units" step-switch is subjected to one single-step counterclockwise advance for each actuation of an associated "units" counter coil 71$h$, the same being actuable upon each print-cycle timing pulse via cam switch 57 or via the associated set-up push button 63$h$ within unit 63. At the same time and in response to the same stimuli, it will be understood that there is a corresponding one-digit advance in the consecutive-number display at 14. Also associated with the "units" counter is a contact 72$h$ which is closed only for the ninth step position of the "units" decade; when thus closed, contact 72$h$ is the means of relaying a print-cycle timing pulse from cam switch 58 to the next or "tens" counter coil 71$g$, via a protective coupling diode 73$h$, so that, upon the next indexing-initiating pulse from cam switch 57, (i) the step switch 70$g$ of the "tens" decade may be given a one-digit advance via the "tens" counter coil 71$g$, while (ii) the step switch 70$h$ of the "units" decade is advanced to its "0"-contact position.

The contact arm of the "units" step switch 70$h$ is continuously connected via line 74$h$ to the 10-pulse (i.e., basic one-digit advancing) input control connection of the check-digit indexing-control signal generator 62, and when the "units" step switch 70$h$ is indexed into its "0"-contact position, this direct connection to generator 62 is transferred via a line 74$g$ to the contact arm of the "tens" step switch 70$g$. Of course it will be understood, from the analogous connections provided for all decade step switches, that if the "tens" step switch 70$g$ happens to be in its "0"-contact position at the same time as the "units" step switch 70$h$ is in its "0"-contact position, then the same direct connection to generator 62 is transferred via a line 74$f$ (in series with lines 74$g$ and 74$h$) to the contact arm of the "hundreds" step switch 70$f$; and so on, depending upon the number of digit positions for which the step switch contact arm is in its "0"-contact position.

In FIG. 5, the thumb switches at unit 60 are shown in groups of three like switches 75-76-77, and each of these is marked with a letter subscript appropriate to the digit position thereby served (corresponding to the letters adopted for successive digit-position print wheels in the consecutive-number printing portion of print head 10). Thus, the three thumb switches 75$h$-76$h$-77$h$ serve the "units" digit position, and each one of these is individually settable, as described for the single switches of unit 60 in FIG. 3. Also as described in FIG. 3, the three thumb switches for all digit positions provide BCD outputs which are connected in parallel, as control inputs to the signal generator 62. The reason for providing thumb switches in clusters of three for each digit position will later appear in connection with a Modulus-10 employment of the invention, but as has already been explained in connection with FIGS. 3 and 4, a single thumb switch for each digit position within unit 60 will adequately serve a weighted Modulus-11 system.

The first BCD-output thumb switch 75$h$ serving the "units" step switch 70$h$ is shown connected to the first four contacts (1-2-3-4) of switch 70$h$; this thumb switch 74 should be set to its "2"-indicated position, to enable a two-digit advance of the check-digit print wheel 45, whenever (i) the "units" step switch 70$h$ is in one of its first four contact positions and (ii) an index-actuating pulse is provided by cam switch 58. The second BCD-output thumb switch 76$h$ serving the "units" step switch 70$h$ is shown connected to only contact "5" of switch 70$h$, while the third BCD-output thumb switch 77$h$ serving the "units" step switch 70$h$ is shown connected to all of the remaining non-zero contacts (6-7-8-9) of switch 70$h$; for the described weighted Modulus-11 system, each of these thumb switches 76$h$-77$h$ should be set to its "2" indicated position, to enable a two-digit advance of the check-digit print wheel 45, for each print cycle in which the "units" step switch 70$h$ is not in its "0"-contact position. Of course, when the "units" step switch 70$h$ is in its "0"-contact position, the above-described decade-transferring function of lines 74$g$-74$f$, etc. will be operative as appropriate (via its cluster of BCD switches, as at 75$g$-76$g$=77$g$) to call for that check-digit print-wheel index multiple which has already been discussed as being uniquely applicable to the particular digit position involved.

It thus appears that for the indicated weighted Modulus-11 system, all three thumb switches 75$a$-76$a$-77$a$ serving the "$10^7$" digit-position step switch 70$a$ should be set to provide the indentical BCD output of "6", meaning a call for a six-digit indexing decrement in the position of check-digit pring wheel 45, for each print cycle in which a one-digit consecutive-number change occurs in the "$0^7$" digit position. By the same token, thumb switches 75b-76b-77b serving the "$10^6$" digit-position switch 70b (not shown) should be set to provide the identical output of "1"; the "$10^5$" thumb switches should be set for the identical output of "3", the "$10^4$" thumb switches should be set for the indentical output of "1", the "$10^3$" thumb switches should be set for the identical output of "1", and the "$10^2$" thumb switches should be set for the identical output of "3", it having already been noted that thumb-switch settings are identically "7" and "2", respectively for the "tens" and "units" digit-position step switches 70g-70h.

Example For Differently Weighted Modulus-11 Application

For simplified discussion, the foregoing has been limited to a single illustrative Modulus-11 system, wherein the positional weighting follows the succession 3-2-7-6-5-4-3-2, in the descending order of digit positions within the 8-digit consecutive-number capacity of the apparatus. Other Modulus-11 systems may be adapted to precisely the same apparatus, merely by first determining and then entering at 60 the check-digit printing wheel index-displacement multiple which is uniquely applicable to each digit position. For example, in an illustrative "geometrically" weighted Modulus-11 system, tabulations, analogous to those expalined above for 3-2-7-6-5-4-3-2 weighting, may be expressed for a particular geometrically weighted system, as follows:

A. Weighting pattern:

| Digit Position: | $10^7$ | $10^6$ | $10^5$ | $10^4$ | $10^3$ | $10^2$ | $10^1$ | units |
|---|---|---|---|---|---|---|---|---|
| Positional Weighting: | $2^8$ | $2^7$ | $2^6$ | $2^5$ | $2^4$ | $2^3$ | $2^2$ | 2 |
| | (256) | (128) | (64) | (32) | (16) | (8) | (4) | (2) |

B. Check-digit print wheel, index decrements:

| Digit Position: | $10^7$ | $10^6$ | $10^5$ | $10^4$ | $10^3$ | $10^2$ | $10^1$ | units |
|---|---|---|---|---|---|---|---|---|
| Check-Digit Decrements: | −5 | −6 | −1 | −4 | 0 | −9 | −8 | −2 |

By merely setting all thumb-switch settings (at each digit position) to the indicated decrements 5-6-1-4-0-9-8-2 at unit 69, the apparatus is immediately converted to serve the indicated geometrically weighted Modulus 11 system. The "0" decrement noted above for the "$10^3$" digit position is meaningful because it applies to a particular one of the ten possible settings of the applicable thumb wheels; thus, no check-digit print wheel shift will be made upon any numerical change (i.e., not to zero) in the "$10^3$" digit position. This situation is illustratively presented in the following tabulation for consecutive numbers preceding and following a "$10^3$" digit-position change:

| Serial Number | Setting of Check-Digit Print Wheel 45 | Check-Digit Decrement | Digit Position Involving Single Digit Change |
|---|---|---|---|
| 00006998 | 8 | | |
| | | −2 | units |
| 00006999 | 6 | | |
| | | 0 | $10^3$ |
| 00007000 | 6 | | |
| | | −2 | units |
| 00007001 | 4 | | |
| | | −2 | units |
| 00007002 | 2 | | |
| | | −2 | units |
| 00007003 | "VOID" | | |
| | | −2 | units |
| 00007004 | 9 | | |

Example for Modulus-10 Application

In application of the invention to weighted Modulus-systems, of course the particular formula will always develop one of ten possible single-digit check-digit solutions, so that the check-digit print wheel should have ten index positions, rather than the eleven discussed in connection with wheel 45. And since only one of ten check-digit answers ever exists, there is no "invalid"-solution situation, so that the word "VOID" is unnecessary. FIG. 8 shows such a 10-position check-digit print wheel 45', closely resembling the print wheel 45 and therefore having its corresponding parts identified by the same reference numerals, with primed notation. The print wheel 45' will be understood to include a gear-toothed end 50' of such size as to mesh with idler 51 upon substitution for print wheel 45 and, in conjunction with the same drive motor 13 to produce a one-digit index (1/10 revolution) of wheel 45' for each 10-pulse index-controlling input to motor 13.

Having substituted the check-digit print wheel 45' appropriate to a Modulus-10 system, there remains only the need to enter contact thumb switch settings (at switches 75a-76a-77a . . . . 75h-76h-77h), appropriate to the positional weighting pattern selected. For example, in an illustrative 8-digit Modulus-10 system wherein the positional weighting is 1-2-1-2-1-2-1-2, the indexing decrements for the check-digit print wheel 45' may be tabulated analogous to the foregoing tabulations of Modulus-11 systems. However, since application of this weighting pattern produces weighting multiples (in every other digit position) wherein the product is ten (e.g., 5 times 2*), it is necessary to make special provision for the contact "5" step-switch position at the affected digit positions. It is for this reason that a special BCD thumb switch is shown in FIG. 5, unique to contact "5" positions. Thus, in the following Modulus 10 tabulations, the three numbers indicated for thumb-switch settings at particular digit positions will be understood to apply for the respective 75-76-77 switches involved at each particular digit position:

| Digit Position: | $10^7$ | $10^6$ | $10^5$ | $10^4$ | $0^3$ | $10^2$ | $10^1$ | units |
|---|---|---|---|---|---|---|---|---|
| Thumb-Switch Settings: | 8-8-8 | 8-9-8 | 6-6-6 | 6-7-6 | 4-4-4 | 4-5-4 | 2-2-2 | 2-3-2 |

*When the weighting product of a weight digit (e.g., "2") times a numerical digit (e.g., 5, 6 . . . 9) is a two-digit number (e.g., 10, 12 . . . . 18), each digit is added separately (e.g., 10, or "1" plus "0" equals 1; 12, or "1" plus "2" equals 3; and 18, or "1" plus "8" equals 9).

The functional result of such settings is illustrated for a sequence of consecutive numbers involving "units" and "$10^2$" position changes, the sequence being extensive enough to illustrate contact-"5" corrections due to the above-noted 2×5 situation:

| Serial Number | Setting of Check-Digit Print Wheel 45' | Check-Digit Decrement | Digit Position Involving Single-Digit Change |
|---|---|---|---|
| 00000494 | 5 | | |
| | | −3 | units |
| 00000495 | 2 | | |
| | | −2 | units |
| 00000496 | 0 | | |
| | | −2 | units |
| 00000497 | 8 | | |
| | | −2 | units |
| 00000498 | 6 | | |
| | | −2 | units |
| 00000499 | 4 | | |
| | | −5 | $10^2$ |
| 00000500 | 9 | | |
| | | −2 | units |
| 00000501 | 7 | | |
| | | −2 | units |
| 00000502 | 5 | | |
| | | −2 | units |
| 00000503 | 3 | | |
| | | −2 | units |
| 00000504 | 1 | | |
| | | −3 | units |
| 00000505 | 8 | | |
| | | −2 | units |
| 00000506 | 6 | | |
| | | −2 | units |

EXAMPLE FOR WEIGHTED MODULUS-97 APPLICATION

In the examples thus far given, it has been assumed that only one digit position is available for check-digit printing, and that the printed check digit is to be readable within a single decade of numbers, specifically, one of the numbers 0, 1, 2, . . . 9. However, self-checking systems are known or possible in which two or more digit positions are assigned for check-digit printing; thus, two-digit printing of a much larger variety of check digitis, from within as many as ten decades (or hundreds) of different check-digit numbers, are machine-readable for printing of check-digit numbers having two or more digits. In ensuing discussion, two different two-digit modulus systems will be illustratively considered: a weighted Modulus-97 system, and one of the weighted Modulus-11 systems which has already been discussed for single-digit print-out.

The Modulus-97 system selected for illustrative discussion happens to be that which is described and set forth in U.S. Pat. No. 3,913,067, particularly in respect to FIG. 4 of said patent, wherein the weighting pattern may be expressed as follows:

| Digit Position: | $10^7$ | $10^6$ | $10^5$ | $10^4$ | $10^3$ | $10^2$ | $10^1$ | units |
|---|---|---|---|---|---|---|---|---|
| Positional Weighting: | 03 | 30 | 09 | 90 | 27 | 76 | 81 | 34 |

In accordance with the invention, check-digit increments for two-digit print-out of this weighting are expressed as:

B. Printed check-digit index increments:

| Digit Position: | $10^7$ | $10^6$ | $10^5$ | $10^4$ | $10^3$ | $10^2$ | $10^1$ | units |
|---|---|---|---|---|---|---|---|---|
| Check-Digit Increments: | +81 | +87 | +50 | +68 | +54 | +11 | +66 | +34 |

For application of the invention to a thus-weighted Modulus-97 system, the already described components and circuitry are directly utilizable, except for the fact that the print head must be capable of printing both "tens" and "units" positional components of check digits, as by employing two print wheels of the nature shown in FIG. 8 (i.e., inscribed to print one of the digits 0, 1, 2 . . . 9 in the associated one of ten equally divided angular increments, per print-wheel revolution). Circuitry and components to achieve this purpose and result are shown in FIGS. 9 and 10.

Referring more particularly to FIG. 9, a two-digit (illustratively Modulus-97) check-digit employment of the invention utilizes a print head 10' which may resemble the head 10 of FIG. 6 in all respects except for inclusion of a first or "tens" print wheel 45A and a second or "units" print wheel 45B mounted in side-by-side adjacency and for independent rotationally indexed positioning about the axis of the serial-number print wheels a, b, c . . . h. A first stepmotor 80 is provided for the "tens" positioning of print wheel 45A, via gear means 81, and a second stepmotor 82 is similarly provided for the "units" positioning of print wheel 45B, via gear means 83. The basic position-control information required for operation of motors 80 and 81 is provided by a "97-position" coded wheel 84 (in view of illustrative consideration of a Modulus-97 system) having BCD coding of "tens" angular-position data on its left face 84D and having BCD coding of "units" angular-position data on its right face 84B (see FIGS. 9A and 9B). As will become clear, angular repositioning of the coded wheel 84 is synchronized to occur in phase-interlace with print-hammer action, i.e., in camshaft-timed control of the switch pulses developed in lines 57-58, from cams 55-56, respectively. And the drive of each stepmotor 80 (82) involves independent employment of a driver circuit 85 (86) which unidirectionally advances the stepmotor 80 (82) until a comparator circuit 87 (88) senses, by read-out at 91 (92), that a motor-position coded wheel 89 (90) has achieved the BCD position called for by an instantaneously applicable read-out at 93 (94) of the relevant coded face 84A (84B) of the coded wheel 84. A synchronizing-control connection 62" from generator 62' to each of the comparators 87-88 will be understood to determine comparator output only after completion of each index-control operation of wheel 84.

It will be understood that for simplicity in FIGS. 9A and 9B, the full four-element binary code (BCD) has not been drawn for each of the "tens" and "units" faces 84A and 84B involved. It should suffice to indicate that on the "tens" code face, the four channels of tens-dividing sectors are BCD-identifiable through suitably coded marking of the four concentric circular regions shown, the basic decades of tens subdivision being labeled as sectors, ending with a small sector labeled "90", meaning that it serves the last seven of the possible 97 angular positions involved for wheel 84. In similar fashion, the corresponding sectors of the "units" face 84B are labeled for the individual units-divided BCD-encoding with which they are inscribed.

At glance at the remainder of FIG. 9 reveals the close similarity between functional units 59-60-62 serving the single-digit positioning stepmotor 13 in FIG. 3 and the corresponding functional units 59'-60'-62' serving the single stepmotor 13' by means of which the "97-position" coded wheel 84 is advanced, from one serial-number print cycle to the next such cycle, in check-digit increments called for by thumb-switch settings at 60'. In this connection, successively applicable serial-number identities will be displayed at 59', and the two-digit check-digit increment, for each serial-number digit position, will appear at correspondingly arrayed display locations in thumb-switch decimal/binary circuitry 60'. Thus, for the particular Modulus-97 system outlined above, the two thumb wheels at the units location are shown to have been set to display the number "34", meaning that for each succeeding single-digit count advance in this serial-numbering sequence (other than an advance from units position "9" to units position "0") the binary-coded output of circuitry 60' will, via generator 62', cause motor 13' to develop a controlled output-shaft advance equal to 34/97 of a single rotation, i.e., a 34-position advance of the "97-position" coded wheel 84. As shown, separate groups of four BCD output lines serve the respective "units" and "tens" components of the 34-position advance required for each such unitary serial-number advance, the "units" lines being indicated "1", "2", "4", "8", and the "tens" lines being indicated "10", "20", "40", "80".

Step-switch circuitry to achieve the foregoing at 60' is shown in FIG. 10 and will be recognized for its similarity to the circuitry of FIG. 5, although certain elements such as switch-stepping coils 71 and their related connections 72-73 and controls (e.g., 63) have been omitted in the simplified showing of FIG. 10. In FIG. 10, decade step switches 170a, 170b ... 170g, 170h are associated with the respective digit positions of the instantaneously applicable serial number in the advancing sequence thereof, and for each of these step switches, nine of the output contacts are interconnected for actuation of the associated binary-encoding thumb-switch units 175a–176a, 175b–176b ... 175g–176g, 175h–176h, as the case may be. The remaining contacts of each decade step switch is connected directly to the sweep arm of the next-succeeding higher-order step switch, as by line 174h connecting this single contact of the "units" step switch 170h to the sweep arm of the "tens" step switch 170g; similar connections 174g and 174b are shown for higher-order code-wheel-advance controls applicable to the "tens" switch 170g and to the $10^7$ switch 170a, respectively.

The following table is in two parts, respectively indicating operational sequences in the indicated Modulus-97 system, first involving 34-position advances of coded-wheel 84 just prior to and following the 54-position advance which accompanies the serial-number advance from 00000999 to 00001000, and then involving the 34-position advances which precede and follow the 87-position advance which accompanies the serial-number advance from 00999999 to 01000000, it being noted that the respective 34, 54 and 87-position advances in these illustrations correspond to the serial-number digit positions for which precisely these check-digit incremental advances were required by thumb-wheel settings indicated at 60'. In every case, it will be understood that the check-digit print wheels 45A and 45B will have been set in such interlace with each print-hammer cycle as to correctly impress the applicable two-digit check-digit alongside the currently applicable serial number which is concurrently impressed on a document.

| Serial Number | Setting of Check-Digit Print Wheels 45A–45B | Check-Digit Increment | Digit Position Involving Single-Digit Change |
|---|---|---|---|
| 00000998 | 36 | | |
| | | 34 | units |
| 00000999 | 70 | | |
| | | 54 | $10^3$ |
| 00001000 | 27 | | |
| | | 34 | units |
| 00001001 | 61 | | |
| | | 34 | units |
| 00001002 | 08 | | |
| 00999998 | 06 | | |
| | | 34 | units |
| 00999999 | 40 | | |
| | | 87 | $10^6$ |
| 01000000 | 30 | | |
| | | 34 | units |
| 01000001 | 68 | | |
| | | 34 | units |
| 01000002 | 05 | | |

EXAMPLE FOR TWO-DIGIT WEIGHTED MODULUS-11 APPLICATIONS

It will be seen that Modulus-11 systems may be employed in apparatus as described in connection with FIGS. 9 and 10, merely (a) by substituting an appropriately coded "11-position" wheel for the "97-position" wheel 84 and (b) by setting the two-digit thumb wheel settings at 60' as appropriate for the particular positional weighting employed.

Thus, for the first above-described Modulus-11 weighting wherein check-digit decrements have the following relation to positional weighting:

| Digit Position: | $10^7$ | $10^6$ | $10^5$ | $10^4$ | $10^3$ | $10^2$ | $10^1$ | units |
|---|---|---|---|---|---|---|---|---|
| Positional Weighting: | 3 | 2 | 7 | 6 | 5 | 4 | 3 | 2 |
| Check-Digit Decrements: | −6 | −1 | −3 | −1 | −1 | −3 | −7 | −2 | the necessary thumb-wheel settings at 60' need only be made in the "units" settings, the "tens" settings thereof being set to zero. The resultant printing of check digits by wheels 45A and 45B will involve almost exclusive use of the "units" wheel 45B, the "tens" wheel 45A being set at zero at all times except when it becomes set to "1", meaning "10" in order to be able to print this eleventh number (in place of "VOID" in the earlier described embodiment), it being understood that the printed number "10" is eleventh in the succession 00, 01, 02 ... 10.

It will also be understood that with the same "11-position" coded-wheel replacement for the "97-position" wheel 84, and by setting "units" thumb wheels at 60' in accordance with the geometrically weighted Modulus-11 system described above, the corresponding two-digit check-digit printing result will be obtained, i.e., with a "10" print-out in place of the previously described "VOID" print-out. To produce this result, the relation of positional weighting to check-digit decrement settings at 60' will be:

| Digit Position: | $10^7$ | $10^6$ | $10^5$ | $10^4$ | $10^3$ | $10^2$ | $10^1$ | units |
|---|---|---|---|---|---|---|---|---|
| Positional | | | | | | | | |

-continued

| Weighting: | $2^8$ | $2^7$ | $2^6$ | $2^5$ | $2^4$ | $2^3$ | $2^2$ | $2$ |
|---|---|---|---|---|---|---|---|---|
| Check-Digit Decrement Setting: | −05 | −06 | −01 | −04 | −00 | −09 | −08 | −02 |

The preceding discussion makes apparent that the instant invention not only provides a novel means for printing an automatic indication of the validity or invalidity of a serial number printed with a single check-digit print wheel in a consecutive series, but the invention also lends itself to use of mulltiple-digit moduli, with multiple-digit check-digit printing; and by simple modification, the invention may utilize a number of different weighted moduli. Furthermore, the invention requires no computer processing to achieve the printed check-digit. Instead, the invention achieves the computation and printing of the check-digit by electromechanical means. The invention thus provides a novel approach to solving the problem of printing serially coded documents having a high assurance of accuracy.

While the invention has been described in detail for preferred embodiments, it will be understood that modifications may be made without departing from the scope of the invention. For example, it will be appreciated the modulus-related code wheel 84 (i.e., "97-position", in the case of Modulus 97) is but one form of cyclical-storage means for which the currently indexed condition is usefully available as a digital output, herein described as a first or "tens" BCD output and a second or "units" BCD output. Thus, coded wheel 84 and its drive means 13' are effectively, if not the functional equivalent of, a ring counter having a modulus-related number of counting elements per ring cycle. In the fragmentary diagram of FIG. 11, we schematically show substitution of a completely electronic ring-counter 184 for the more mechanical ring counter represented by coded wheel 84.

More particularly, the ring counter 184 in FIG. 11 illustratively serves a Modulus-97 system and may therefore comprises a continuously and sequentially operative "ring" of ninety-seven flip-flop elements, connected for sequential change of state for each index-count pulse or pulse group issued by the index-control signal generator 62'. The ring counter 184 will also be understood to include a digital output indicative of the currently indexed flip-flop element from among the ninety-seven. Such digital output is schematically shown as a "Tens" BCD output 193 supplied to the "Tens" comparator 87 and as a "Units" BCD output 194 supplied to the "Units" comparator 88. The drivers 85–86 then function in response to the respective comparator-derived signals to reposition one or both of the check-digit print wheels 45A–45B in interlace with print-hammer action, in the manner described for operation of FIG. 9. Of course, in application to other moduli, the number of flip-flops per ring at 184 will be understood to correspond to the particular modulus number, with a plurality of orders of BCD output appropriate to the size of the modulus selected; in FIG. 11, a manual knob 184', which may be inscribed with a pointer which is readable against a fixed scale, will be understood to suggest switch means whereby the size of the ring (e.g., number of flip-flops currently used in the cycle of the ring) may be selectively varied, to reflect selection of different moduli.

What is claimed is:

1. In a document printer with means for feeding successive documents to be successively serial-number printed in successive printing cycles, said printer including a sequentially indexible numerical print head and means synchronized with the printing cycle for numerically indexing said head in predetermined equal successive increments from one to the next printing cycle, the improvement which comprises indexible decimal check-digit print means carried by said printer and including means synchronized with said printing cycle for check-digit imprinting of each successive document in accordance with the indexed position of said check-digit print means, and further means synchronized with said printing cycle for changing the indexed position of said check-digit print means in accordance with each successive index increment required by a particular weighted-modulus system of computing check-digits, said further means including decimal-indexing drive means for said check-digit printing means, an indexible cyclic storage device having a number of discrete storage units per cycle corresponding to the particular modulus number involved, said storage device producing ann output reflecting the currently indexed storage condition thereof, a plurality of control devices having control connection to said storage device and settable uniquely for each digit position within the serial-number capacity of said print head, said control devices being preset to determine different unit-indexing control of said storage device in accordance with the requirements of the particular weighted-modulus system, means responsive to the instantaneous serial-number setting of said print head and determining which digit position of the serial number undergoes a single-digit change other than to zero for each successive printing cycle, said last-defined means producing for each printing cycle an output connection to that particular control device which is uniquely set for the particular digit position undergoing the single-digit change other tnan to zero, and a control connection from said storage device to said decimal-indexing drive means, whereby said check-digit printing means may be reset in synchronism with said printing cycle for check-digit printing in accordance with the currently indexed condition of said storage device.

2. The improvement of claim 1, in which said check-digit print means comprises a plurality of different-order independently indexible ten-position print wheels each of which is characterized by different indicia within a decade of printing indicia, said decimal-indexing drive means providing independent decimal-indexing drive of the respective print wheels, as appropriate for the digit position at which each of said wheels is to print for a given required check digit.

3. The improvement of claim 2, in which said plurality is two.

4. The improvement of claim 3, in which said control connection includes a "units" BCD output connection from said storage device to one of said decimal-indexing drives for "units"-indexed positioning of one of said print wheels, and a "tens" BCD output connection from said storage device to the other of said decimal-indexing drives for "tens"-indexed positioning of the other of said print wheels.

5. The improvement of claim 1, in which said storage device comprises indexible wheel means having a number of discrete indexible positions which corresponds to the particular modulus number involved, wheel-index drive means for positioning said wheel means, said control devices having control connection to said wheel-index drive means.

6. The improvement of claim 5, in which said wheel means is inscribed with circumferentially distributed index-position digital indicia, said control connection including stationary digital read-out means positioned to sense the digital indicium for a currently indexed position of said wheel means.

7. The improvement of claim 6, in which said circumferentially distributed index-position indicia include a first circumferentially distributed set of decimal "units"-divided BCD indicia, and a second circumferentially distributed set of decimal "tens"-divided BCD indicia.

8. The improvement of claim 1, in which said storage device is a ring counter having a number of discrete counting elements per ring cycle corresponding to the particular modulus involved.

9. The improvement of claim 8, in which said ring counter includes selectively operable means for changing the number of said counting elements per ring cycle, whereby a modulus-number change may be selected.

10. The improvement of claim 2, in which said print wheels are so oriented with respect to said indexible numerical print head as to enable two-digit check-digit printing adjacent to and in alignment with serial-number printing.

11. In a document printer with means for feeding successive documents to be successively serial-number printed in successive printing cycles, said printer including a sequentially indexible numerical print had and means synchronized with the printing cycle for numerically indexing said head in predetermined equal successive increments from one to the next printing cycle, the improvement which comprises indexible check-digit print means carried by said printer and including means synchronized with said printing cycle for check-digit imprinting of each successive document in accordance with the indexed position of said check-digit print means, and further means synchronized with said printing cycle for changing the indexed position of said check-digit print means in accordance with each successive index increment required by a particular weighted-modulus system of computing check-digits, said further means including a basic unitindexing drive for said check-digit printing means, a plurality of control devices having control connection to said drive and settable uniquelly for each digit position within the serial-number capacity of said print head, said control devices being preset to determine different integer-multiple control of said unit-indexing drive in accordance with the requirements of the particular weighted-modulus system, and counter means responsive to the instantaneous serial-number setting of said print head and determining which digit position of the serial number undergoes a single-digit change other than to zero for each successive printing cycle, said counter means producing for each printing cycle an output connection to that particular control device which is uniquely set for the particular digit position undergoing the single-digit change other than to zero.

12. The improvement of claim 11, in which the weighted-modulus system is modulus 10, and in which check-digit print means has ten indexible positions, each of said positions being characterized by different indicia within a decade of singledigit printing indicia.

13. The improvement of claim 11, in which the weighted-modulus sytem is modulus 11, and in which said check-digit print means has eleven indexible positions, ten of which are characterized by different indicia within a decade of single-digit printing indicia, and the eleventh of which is characterized by an invalidity-indicating indicium.

14. The improvement of claim 13, in which said invalidity-indicating indicidum includes a formation adapted to print the word "VOID".

15. The improvement of claim 11, in which the unit-indexing drive includes a stepping motor.

16. The improvement of claim 11, in which said control device includes a signal generator for converting a binary-coded decimal input to an output controlling said unit-indexing drive.

17. The improvement of claim 11, in which said counter means includes step-switch means operatively coupled to determine that digit position of said serial number which undergoes a change other than to zero for each print cycle of said printer.

18. The improvement of claim 11, in which each said control device includes selectively operable means for providing one of at least two different integer-multiples dependent upon digit position within the serial-number capacity of said print head.

19. The improvement of claim 11, further including a control module remote from and flexibly connected to said printer, said control module including means for display of each serial number to be printed.

20. The improvement of claim 14, in which said control module includes for each settable control device a numerical display of the set condition thereof.

21. The improvement of claim 11, further including a means for providing a delay $\delta$ between said numerical indexing of said numerical print head and said indexing of said checkdigit print means.

22. In a document printer with means for feeding successive documents to be successively serial-number printed in successive printing cycles, said printer including a sequentially indexible numerical print head and means synchronized with the printing cycle for numerically indexing said head in predetermined equal successive increments from one to the next printing cycle, the improvement which comprises indexible check-digit print means carried by said printer and including means synchronized with said printing cycle for check-digit imprinting of each successive document in accordance with the indexed position of said check-digit print means, and further means synchronized with said printing cycle for changing the indexed position of said check-digit print means in accordance with each successive index increment required by a particular weighted-modulus system of computing checkdigits, said further means including a basic unit-indexing drive for said check-digit printing means, a plurality of control devices having control connection to said drive and settable uniquely for each digit position within the serial-number capacity of said print head, said control devices being preset to determine different integer-multiple control of said unit-indexing drive in accordance with the requirements of the particular weighted-modulus system, and digit-change sensing means responsive to the instantaneous serial-number setting of said print head and determining which digit position of the serial number undergoes a single-digit change other than to zero for each successive printing cycle, said digit-change sensing means producing for each printing cycle an output connection to that particular control device which is uniquely set for the particular digit position undergoing the single-digit change other than to zero.

23. In a document printer with means for feeding successive documents to be successively serial-number printed in successive printing cycle, said printer including a sequentially indexible numerical print head and means synchronized with the printing cycle for numerically indexing said head in predetermined equal successive increments fron one to the next printing cycle, the improvement which comprises indexible check-digit print means carried by said printer and including means synchronized with said printing cycle for check-digit imprinting of each successive document in accordance with the currently indexed condition of said checkdigit print means, said check-digit print means having a cycle of different indexed conditions corresponding to the modulus number required by a particular weighted-modulus system of computing check digits, said check-digit print means having the capacity to print a particular one of a plurality of different check digits for each indexed condition thereof, and further means synchronized with said printing cycle for changing the indexed condition of said check-digit print means in accordance with each successive index increment by the particular weighted-modulus system of computing check-digits, said further means including indexing-drive means for said check-digit printing means, a plurality of control devices having control connection to said drive means and settable uniquely for each digit position within the serial-number capacity of said print head, said control devices being preset to ddetermine different check-digit increments of indexing control of said indexing-drive means in accordance with the requirements of the particular weighted-modulus system, and means responsive to the instantaneous serial-number setting of said print head and determining which digit position of the serial number undergoes a single-digit change other than to zero for each successive printing cycle, said last-defined means producing for each printing cycle an output connection to that particular control device which is uniquely set for the particular digit position undergoing the single-digit change other than to zero.

24. The improvement of claim 22, in which the weighted-modulus system is Modulus 11, and in which said check-digit print means has eleven indexible stations, ten of which are characterized by different indicia within a decade of single-digit printing indicia.

25. The improvement of claim 24, in which said check-digit print means includes a print wheel, and in which said unit-indexing drive includes a pulse-operated motor having an output connection to said print wheel and adapted to accept a predetermined number of successive input pulses corresponding to a one-station index of said print wheel.

26. The improvement of claim 25, in which said predetermined number is ten, whereby single-pulse inputs to said motor may enable set-up correction in an initial placement of said check-digit print wheel for best orientation to print at one of its indexed positions.

* * * * *